March 8, 1949. A. ARUTUNOFF 2,463,590
WEIGHT-CARRYING CABLE
Filed Oct. 25, 1946 2 Sheets-Sheet 1
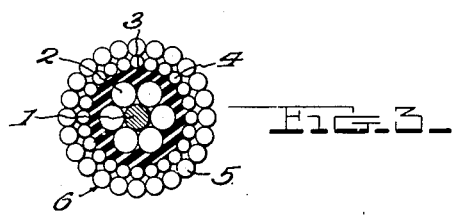
FIG.3.
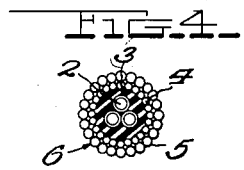
FIG.4.
FIG.10.
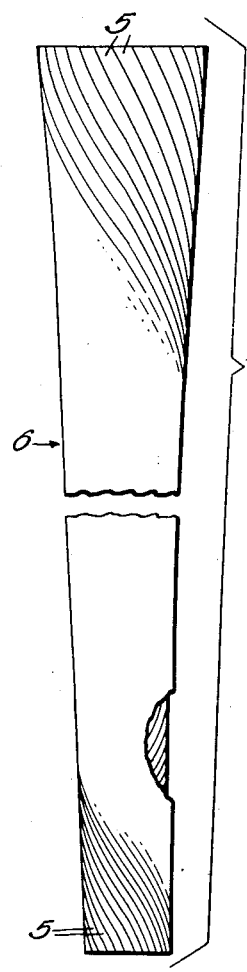
FIG.1.
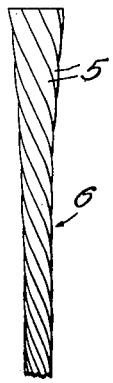
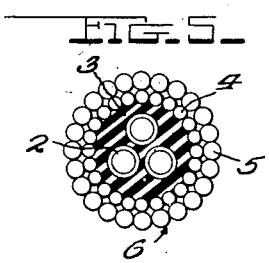
FIG.5.
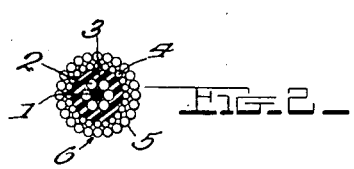
FIG.2.
Inventor
Armais Arutunoff
By Baldwin, Wight &
attys.

March 8, 1949.　　　A. ARUTUNOFF　　　2,463,590
WEIGHT-CARRYING CABLE
Filed Oct. 25, 1946　　　2 Sheets-Sheet 2
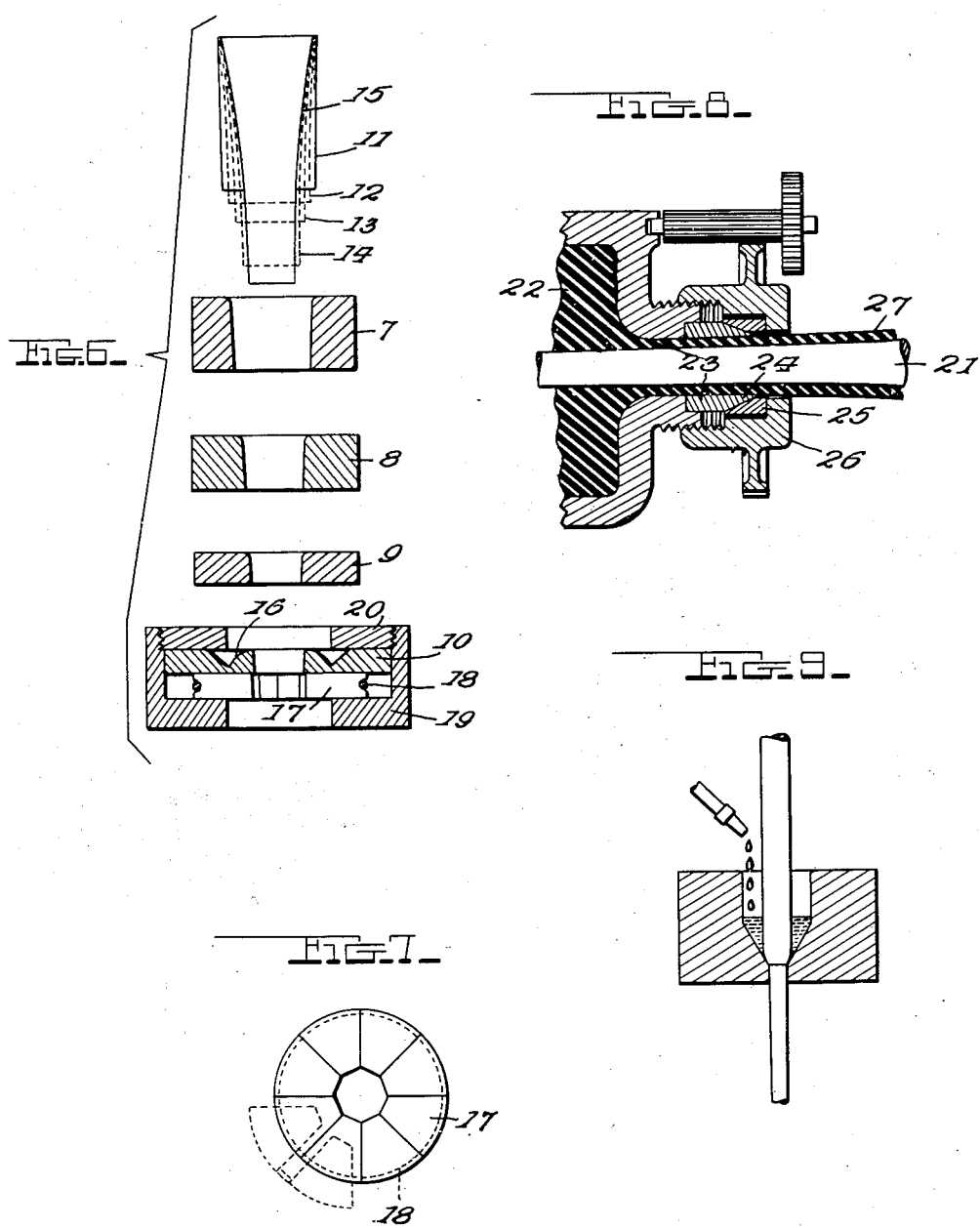
Inventor
Armais Arutunoff
By Baldwin, Wight & Brown
attys.

Patented Mar. 8, 1949

2,463,590

UNITED STATES PATENT OFFICE 2,463,590

WEIGHT-CARRYING CABLE

Armais Arutunoff, Bartlesville, Okla.

Application October 25, 1946, Serial No. 705,617

6 Claims. (Cl. 174—108)

1

The present invention relates to cables for supporting relatively heavy loads at the lower end thereof. The invention more specifically pertains to an electrical cable for suspending electrical well drilling means in a bore hole and which must be lowered into and raised from a well having a depth as great as 18,000 feet.

In well drilling operations, it is extremely important to avoid the loss of any of the drill parts or other accessories in the bore hole. In some well drilling operations and when such rigid parts have been lost in the well, it is often necessary to abandon the drilled hole. Thus in well drilling operations wherein the cutting is accomplished by electrical drilling devices, the cable for suspending the drilling mechanism in the well should have a safety factor at least as high as six to one as prescribed by the usual wire rope practice. The wire rope available prior to the present invention does not have such a factor of safety and even the recently developed types can support only a weight of 48,000 feet of its own length. A safety factor of six to one is possible with such prior cable only if the length does not exceed 8,000 feet when the cable is not supporting any useful load. The loads usually carried by well drilling cables amount to approximately thirty per cent of the total weight of a cable and the load. Thus the required safety factor for ordinary stranded cable corresponds to a length of only 5,600 feet which length is further reduced if electrical conductors are supported by the cable.

It is accordingly an object of the present invention to provide a cable which may be employed for suspending drilling equipment in a well and for supplying electrical energy to the drilling device without danger of the load carried by the lower end thereof breaking the cable.

A further object of the present invention resides in the provision of a cable wherein the cross sectional dimensions of the strands forming the elements of the cable progressively increase from one end to the other.

Another object of the invention is to provide an electrical cable wherein the electrical conductors are insulated from other parts of the cable and the conductors and the load carrying strands are all of tapered form.

A still further object of the invention is to provide a stranded load-carrying cable having the characteristic of uniform strength considered from its lower end to its upper end.

Other objects and features of the invention will be more apparent as the present disclosure proceeds and upon consideration of the accompanying drawings and the following detailed description wherein an embodiment of the invention is disclosed.

In the drawing:

Fig. 1 is a diagrammatic side elevational view of a cable embodying the invention;

Fig. 2 is an end view of a cable taken at the lower end thereof;

Fig. 3 is an end view of the upper end of the cable;

Fig. 4 is a view of the lower end of a cable provided with a plurality of electrical conductors;

Fig. 5 is an end view of the upper end of such cable;

Fig. 6 is a diagrammatic view showing a die arrangement for drawing tapered wire;

Fig. 7 is a plan view of slidable and expandable parts for supporting a drawing die;

Fig. 8 is a sectional view illustrating apparatus for applying insulating material to tapered wire;

Fig. 9 is a sectional diagrammatic view illustrating means for controlling the wearing rate of a drawing die; and Fig. 10 is a side elevational view of a load-carrying cable having uniform strength.

From the above it will be apparent that the present invention pertains to a cable adapted to be arranged in a vertical manner and provided with sufficient strength throughout to permit the cable to be of substantially unlimited length without the weight of the lower portion thereof exceeding the tensile strength of the cable. The invention also pertains to a cable adapted to support a useful load at the lower end thereof such as well drilling equipment which is often lowered into the bore hole a distance as great as 18,000 feet. The cable forming the subject-matter of the present invention is adapted to support useful loads at the lower ends thereof at such depths and at the same time provide a factor of safety sufficiently high for normally preventing severing of the cable under the load carried by the lower end thereof.

Referring to the drawing, there is shown in Fig. 1 a cable of tapered form and the taper represented corresponds to a cable length of approximately 18,000 feet. The lower end of the cable has a diameter approximating that shown in Fig. 2 while the upper end is materially larger and is represented in Fig. 3. The cable includes electrical conductors 2 which may be formed of stranded wire and the electrical conductors may be of any number such as six in Fig. 3 or three in number as shown in Fig. 5. The electrical conductors 2 are helically wound about a center string 1. The electrical conductors are encased in suitable insulation 3 and this assembly forms the core of the cable. The weight-carrying armoring may include two layers of helically arranged wires 4 and 5. The wires 4 are preferably arranged to extend in one helical direction while the wires 5 have an opposite lay to provide a cable 6 which is non-spinning or one devoid of any tendency to coil or turn about its longitudinal axis. The strands of the cable such as the armoring or weight carrying wires 4 and 5 and the electrical conductors all taper from one end of the cable to the other and in such a manner that the cross section of the cable at any distance from the smaller end satisfies the following equation for a cable or wire of uniform strength:

$$A = W \frac{f}{t} \cdot e^{c \frac{f}{t} L} \qquad f = 6:1$$

Thus in forming the strands, the tapering follows the mathematical rule for a wire of uniform strength as hereinabove set forth. It is to be noted that a change in diameter for a unit of length for the larger or upper end portion of the wire must be greater than a corresponding change for the smaller and lower end portion to satisfy the equation.

Thus in carrying out the invention the material for the die in which the wire is drawn, is so selected that the die has wearing characteristics at the desired rate of taper to thereby impart to the wire a gradual enlargement of cross section so as to provide a strand for the cable having the desired change in tensile strength. A wire of cylindrical shape is passed through one of several dies such as shown at 7, 8 and 9 in Figs. 6. The number of passes required for the wire depends upon the length of the stock. Each die is so dimensioned and so constructed that it wears away to the size of the original stock and leaves the wire unaffected. A fourth die 10 is also shown in Fig. 6 and may be used to convert the tapered wire into a wire of uniform strength. The transformation of the cylindrical stock 11 into a tapered wire is indicated by the dotted lines 12, 13 and 14. The transformation of the tapered wire 14 into a wire of uniform strength is indicated by the line 15. To insure uniform wear along the length of the die assembly, the orifice of each die is provided with a slight taper toward its smaller end. It will be further observed that the length of each successive die is much shorter than that of the preceding die.

The die 10 is of special configuration and the curved line 16 thereof corresponds to the contracted form of the contour curve of a wire of uniform strength. The die includes supports 17 which are normally converged concentrically of the die by means of an elastic band 18 which biases the parts 17 radially inward. The die parts are encased within a housing 19 which is provided with a cover 20 having an opening through which the tapered wire extends.

The dies may be arranged so that the wire moves vertically downward in forming the tapered strand and additional control means may be provided for the rate of wear of the die openings. The rate of wearing of the die orifices may be controlled by supplying a measured quantity of abrasive to the die as shown in Fig. 9.

Another feature of the invention pertains to applying insulating material to the tapered wires and means for carrying out this feature is shown in Fig. 8. One of the tapered wires is represented at 21 and extends outwardly from the chamber 22 with its larger end passing through the orifice first. The die part 23 is adjustable in diameter and diminishes in size along with the decrease in diameter of the wire 21 passing therethrough. The die part 23 is formed of compressible material and is provided with a cone-shaped end portion 24. A tapered ring 25 surrounds this cone-shaped end portion 24 as shown in Fig. 8. Thus when the ring 25 is moved to the left in Fig. 8, by turning the member 26, the tapered end portion of the die 23 is displaced inwardly to decrease the thickness of the insulation 27 being applied along the length of the wire 21. When uniform thickness jacket insulation is employed, there is space available in the cable for making the conductors of considerably larger ratio of end cross sections then the corresponding ratio of the outer weight carrying armoring wires. Such an arrangement permits the use of low tensile strength material for the electrical conductors without having the weight of the electrical conductors become a burden on the armoring or weight-carrying wires. In any event, the tapered electrical conductors are of the uniform strength type and can be drawn to a temper which will assure an ability to carry weight of its own full length plus a share of the total weight of the insulation.

While the invention has been described with reference to a cable of specific structural details, it will be apparent that the cable may be assembled in other forms and by methods other than those herein disclosed. Such changes and variations in the method of forming the cable may be made without departing from the spirit and scope of the invention as set forth in the appended claims.

What I claim and desire to secure by Letters Patent is:

1. A cable comprising, a central tapered core and strands of tapered wires around said tapered core, every length of each of said wires being progressively and continuously reduced in diameter from the upper to the lower extremity of said wires.

2. In a wire rope, a central tapered core, and strands of tapered wires around said core with the tapering thereof proceeding in the same direction as the tapered core every length of said core and of each of said wires being progressively and continuously reduced in diameter from the upper to the lower extremity of said wires.

3. A cable comprising, a central tapered metallic core, and strands of tapered wires around the core with the tapering thereof proceeding in the same direction as the tapered core, every length of each of said wires being progressively and continuously reduced in diameter from the upper to the lower extremity of said wires.

4. In a cable, a central tapered core, strands of tapered wires connected to said core with the tapering thereof proceeding in the same direction as the tapered core, and insulating material surrounding said strands.

5. In a tapered cable, a central tapered core, strands of tapered wires around said core, insulating material surrounding said strands, and a layer of tapered wires around said insulation.

6. In a tapered cable, tapered electrical conductors, insulation surrounding said electrical conductors, a layer of tapered wires around said insulation arranged in one direction of lay, and another layer of tapered wires around the first layer having an opposite direction of lay.

ARMAIS ARUTUNOFF.

REFERENCES CITED

The following references are of record in the file of this patent:

UNITED STATES PATENTS

| Number | Name | Date |
|---|---|---|
| 1,013,016 | Horton | Dec. 26, 1911 |
| 1,937,104 | Thomsen | Nov. 28, 1933 |
| 1,972,316 | Randolph | Sept. 4, 1934 |
| 2,165,566 | Meakin | July 11, 1939 |
| 2,192,429 | McConnell | Mar. 12, 1940 |

FOREIGN PATENTS

| Number | Country | Date |
|---|---|---|
| 9935/08 | Great Britain | Apr. 29, 1909 |